US008549580B2

(12) United States Patent
Hwang et al.

(10) Patent No.: US 8,549,580 B2
(45) Date of Patent: Oct. 1, 2013

(54) METHOD AND APPARATUS FOR PROVIDING SOFTWARE SECURITY

(75) Inventors: Dong hyeok Hwang, Seoul (KR); Seok gu Yun, Seoul (KR)

(73) Assignee: Teruten, Inc. (KR)

( * ) Notice: Subject to any disclaimer, the term of this patent is extended or adjusted under 35 U.S.C. 154(b) by 879 days.

(21) Appl. No.: 12/674,345

(22) PCT Filed: Jun. 25, 2008

(86) PCT No.: PCT/KR2008/003612
§ 371 (c)(1),
(2), (4) Date: Feb. 19, 2010

(87) PCT Pub. No.: WO2009/025444
PCT Pub. Date: Feb. 26, 2009

(65) Prior Publication Data
US 2011/0162041 A1    Jun. 30, 2011

(30) Foreign Application Priority Data
Aug. 20, 2007  (KR) .......................... 10-2007-0083251

(51) Int. Cl.
*G06F 7/04* (2006.01)
*G06F 12/14* (2006.01)
*G06F 13/00* (2006.01)
*G06F 17/30* (2006.01)
*G06F 11/30* (2006.01)
*G06F 12/16* (2006.01)
*G06F 21/00* (2013.01)
*G11C 7/00* (2006.01)
*G08B 23/00* (2006.01)
*H04N 7/16* (2011.01)

(52) U.S. Cl.
USPC ........ 726/2; 726/17; 726/24; 726/27; 726/32; 705/51; 713/187; 713/188; 713/193; 713/194

(58) Field of Classification Search
USPC ............................................................ 726/2
See application file for complete search history.

(56) References Cited

U.S. PATENT DOCUMENTS

| 5,163,147 A * | 11/1992 | Orita ........................................ 1/1 |
| 7,874,001 B2 * | 1/2011 | Beck et al. ...................... 726/23 |
| 8,341,414 B2 * | 12/2012 | Lee et al. ...................... 713/176 |
| 2002/0013802 A1 * | 1/2002 | Mori et al. ...................... 709/1 |

(Continued)

FOREIGN PATENT DOCUMENTS

| KR | 10-2002-0041367 | 6/2002 |
| KR | 10-2006-0058427 | 5/2006 |

(Continued)

OTHER PUBLICATIONS

International Search Report-PCT/KR2008/003612 dated Dec. 23, 2008.
Written Opinion-PCT/KR2008/003612 dated Dec. 23, 2008.

*Primary Examiner* — Carolyn B Kosowski
(74) *Attorney, Agent, or Firm* — Cantor Colburn LLP

(57) ABSTRACT

A method and apparatus for providing software security is provided. In the software security method, an installation file of software that includes at least one execution file and at least one data file which are stored in a user terminal is executed. Accordingly, at least one virtual execution file corresponding to the at least one execution file and at least one virtual data file corresponding to the at least one data file are installed in a user area of the user terminal, and the at least one execution file, the at least one data file, and a controller for controlling the at least one virtual execution file and the at least one execution file are installed in a security area of the user terminal.

11 Claims, 2 Drawing Sheets

(56) References Cited

U.S. PATENT DOCUMENTS

2003/0055939 A1* 3/2003 Kayashima et al. .......... 709/223
2005/0257266 A1* 11/2005 Cook et al. .................. 726/23
2010/0088699 A1* 4/2010 Sasaki ........................ 718/1

FOREIGN PATENT DOCUMENTS

| KR | 10-2006-0062587 | 6/2006 |
|----|-----------------|--------|
| KR | 100692964 | 3/2007 |
| KR | 10-2008-0111888 | 12/2008 |

* cited by examiner

METHOD AND APPARATUS FOR PROVIDING SOFTWARE SECURITY

TECHNICAL FIELD

The present invention relates to a method of providing software security, and more particularly, to a method and apparatus for providing software security, by which software installed in a terminal of a user can be prevented from being used or copied without permission.

BACKGROUND ART

FIG. 1 is a block diagram for illustrating a conventional method of installing software. Referring to FIG. 1, a conventional software distributor may generate an installation file (for example, a setup file) 30 from a plurality of files 10, which constitute the software, by using an installation file manufacturing instrument 20.

When a user of the software executes the installation file 30 (for example, double-clicks a mouse or presses the enter key) and designates a predetermined user area (for example, c:\program files\~), the files 10 are installed (or stored) in the designated user area. Here, the term "user area" denotes all local disk areas of a user terminal which are able to be assessed by a user and can temporarily store predetermined files.

Of course, some of the files 10 may be stored in an area (for example, a system folder of an operating system (OS)) other than the user area designated by the user.

As described above with reference to FIG. 1, in the conventional software installing method, the software may be secured according to a well-known method of certifying legitimacy of the user through a predetermined authentication procedure (for example, the input of a serial number) while the files 10 are being installed.

However, in the conventional software securing method, a simple authentication procedure is performed only during software installation, but a security solution cannot be provided. However, even the simple authentication procedure fails to properly function due to cracking or leakage of the serial number or the like.

In addition, if users can know, even without using the installation file 30, a path along which the files 10 are installed through the installation file 30, some of the files 10 may be copied without permission and installed in other systems or devices and thus the software may be used without authorization.

As a method of controlling the usage authority (for example, execution) of the installed software, there only exists a method of controlling the execution of software by only using an expired date. However, a distributor of the software needs to control the usage authority of the software according to more various criterions (for example, a usage frequency, a user authentication performed during execution of the software, etc.). This remains a demand for a method and apparatus for providing software security, by which various security methods are provided not only during installation of software but also during execution of the installed software after the software installation and by which unauthorized duplication and/or use of the installed software can be prevented.

DISCLOSURE

[Technical Problem]

The present invention provides a method and apparatus for providing software security, by which various security methods can be provided not only during installation of software but also during execution of the software after the installation of the software and by which unauthorized duplication and/or usage of the installed software can be prevented.

The present invention also provides a method and apparatus for providing software security, by which a distributor of software can set a predetermined security function when an installation file is produced from files that constitute the software.

[Advantageous Effects]

As described above, in a method and apparatus for providing software security according to the present invention, various security methods can be provided not only during installation of software but also during execution of the software after the installation of the software, and unauthorized duplication and/or usage of the installed software can be prevented.

In addition, a distributor of software can set a predetermined security function when an installation file is produced with files that constitute the software. Since usage authority cannot be controlled only during installation of the software but also can be controlled according to various criterions every time a user executes the software, various selling models and various paid policies can be applied. Furthermore, users do not need to perform special operations in order to set a security area in a user terminal, the security area is automatically mounted by only executing the installation file. Files installed in a user area of the user terminal according to a software installing method according to the present invention are similar to those installed according to an existing software installing method. Thus, users do not feel a big difference between the software installing method according to the present invention and the existing software installing method, and thus may feel convenient.

DESCRIPTION OF DRAWINGS

The above and other features and advantages of the present general inventive concept will become more apparent by describing in detail exemplary embodiments thereof with reference to the attached drawings in which.

BEST MODE

Figure 1:
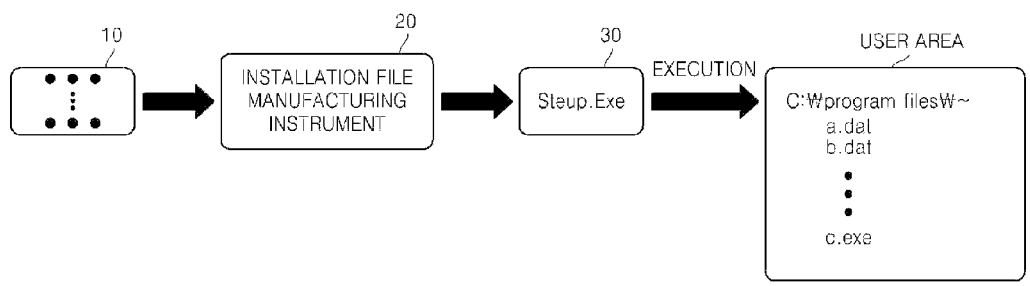
FIG. 1 is a block diagram for illustrating a conventional method of installing software.

According to an aspect of the present invention, there is provided a software security method including: executing an installation file of software that includes at least one execution file and at least one data file which are stored in a user terminal; and accordingly installing at least one virtual execution file corresponding to the at least one execution file and at least one virtual data file corresponding to the at least one data file in a user area of the user terminal and installing, in a security area of the user terminal, the at least one execution file, the at least one data file, and a controller for controlling the at least one virtual execution file and the at least one execution file.

The software security method may further include executing a first virtual execution file from among the at least one virtual execution file installed in the user area; and accordingly executing a first execution file corresponding to the first virtual execution file, wherein the first execution file is installed in the security area.

The software security method may further include executing at least one of user authentication, usage frequency authentication, and usage duration authentication when the first virtual execution file is executed. The software security method may further include activating the controller when the first virtual execution file is executed.

When the controller outputs a message indicating that the first execution file refers to the first virtual data file from among the at least one virtual execution file installed in the user area, the controller may hook the message and control a path for the first data file corresponding to the first virtual data file to return to the first execution file.

The security area may be a virtual drive. The installation file may include the virtual drive and a virtual device driver for automatically mounting the virtual drive when the installation file is executed.

The security area may further include a setting file including information about setting of at least one security function set during production of the installation file, and at least one security module corresponding to the at least one security function. The controller may control the at least one security module to perform the at least one security function on the basis of information stored in the setting file. The at least one security function may include at least one of a screen saving function, a screen capturing preventing function, and a clip board controlling function.

According to another aspect of the present invention, there is provided a software security method including: receiving information about selection of a security function and information about setting of a selected security function from a distributor in order to produce an installation file of software that includes at least one execution file and at least one data file; and producing the installation file by packaging a security module corresponding to the selected security function, a setting file including the setting information, and a controller for controlling the security function together with the at least one execution file and the at least one data file. The software security method may further include an operation in which when an event corresponding to the setting information is generated during execution of the at least one execution file, the controller activates a security module corresponding to the event. The software security methods may be recorded in a computer-readable recording medium.

According to another aspect of the present invention, there is provided a software security apparatus including a memory storing a program; and a central processing unit (CPU) performing the program, wherein the program is performed under the control of the CPU so that when an installation file of software that includes at least one execution file and at least one data file which are stored in a user terminal is executed, at least one virtual execution file corresponding to the at least one execution file and at least one virtual data file corresponding to the at least one data file are installed in a user area of the user terminal, and the at least one execution file, the at least one data file, and a controller for controlling the at least one virtual execution file and the at least one execution file are installed in a security area of the user terminal.

The program may perform a control operation so that when a first virtual execution file from among the at least one virtual execution file installed in the user area is executed, a first execution file corresponding to the first virtual execution file, the first execution file being installed in the security area, is executed. The program may control the controller to be activated when the first virtual execution file is executed. When the controller outputs a message indicating that the first execution file refers to the first virtual data file from among the at least one virtual execution file installed in the user area, the controller may hook the message and control a path for the first data file corresponding to the first virtual data file to return to the first execution file.

According to another aspect of the present invention, there is provided a software security apparatus including: an interface unit receiving information about selection of a security function and information about setting of a selected security function from a distributor in order to produce an installation file of software that includes at least one execution file and at least one data file; and a packaging module producing the installation file by packaging a security module corresponding to the selected security function, a setting file including the setting information, and a controller for controlling the security function together with the at least one execution file and the at least one data file.

When an event corresponding to the setting information is generated during execution of the at least one execution file, the controller may activate a security module corresponding to the event.

[Mode for Invention]

The attached drawings for illustrating preferred embodiments of the present invention are referred to in order to gain a sufficient understanding of the present invention, the merits thereof, and the objectives accomplished by the implementation of the present invention.

It will be understood that when an element is said to be "transmitting" data to another element, the element can directly transmit the data to another element or transmit the data to another element via at least one other element. In contrast, when an element is said to be "directly transmitting" data to another element, the element transmits the data to another element without passing through any other element.

Hereinafter, the present invention will be described in detail by explaining preferred embodiments of the invention with reference to the attached drawings. Like reference numerals in the drawings denote like elements.

Figure 2:
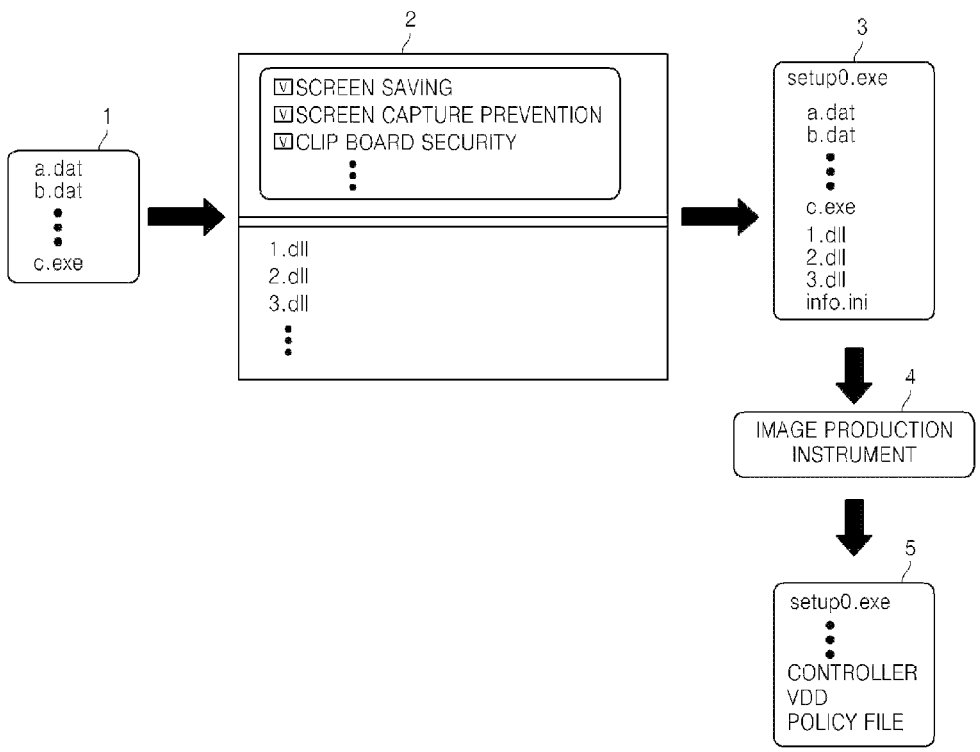
FIG. 2 is a data flowchart for illustrating a method of providing security for software, according to an embodiment of the present invention.

FIG. 2 is a data flowchart for illustrating a method of providing security for software, according to an embodiment of the present invention. Referring to FIG. 2, a plurality of files 1, which constitute the software, may be stored in a system (for example, a computer or a server) (not shown) of a software distributor (or a software seller).

The files 1 may denote not only some of the files constituting the software but also a folder including the files constituting the software. The files 1 may include at least one execution file that allows the software to be executed in a user terminal, and a data file such as a data file or a library required for the execution file to drive the software.

In the software security method according to the embodiment of FIG. 2, an installation file manufacturing instrument 2 may be provided to manufacture an installation file 3 by packaging the files 1, and the software distributor may package the files 1 by using the installation file manufacturing instrument 2. The installation file manufacturing instrument 2 may not only have a packaging function, which is provided by a conventional instrument (for example, an install shield) for producing the installation file 3 (for example, setup0.6exe), but also have a security function which is desired by the software distributor during packaging.

The installation file manufacturing instrument 2 receives, from the software distributor, information about selection of the files 1, which constitute the software, from among a plurality of files stored in the system of the software distributor, through a predetermined action (for example, clicking and/or dragging) of the software distributor. The software distributor may select the files 1 using the installation file manufacturing instrument 2 and set security functions in at least some of the files 1.

Information about the files in which the security functions have been set and information about the security functions may be stored in a setting file (for example, info.ini). A security module (for example, *.dll) for performing each of the security functions, and the setting file may be installed in a security area of the user terminal as described later. For example, the security functions may be various functions such as a screen saving function, a screen capture prevention function, and a clipboard security function as illustrated in FIG. 2, but the present invention is not limited to these examples. For example, the software distributor may set a screen capture prevention function to be performed when a first file of the files 1 is displayed. The software distributor may also set a clipboard security function to be disabled while a second file of the files 1 is being executed.

As described above, information about such setting of security functions and a list of files in which security is to be set may be stored in the setting file. Of course, the list of files in which security is to be set and the information about the setting of security functions may be stored in a file other than the setting file.

Security modules (for example, 1.dll, 2.dll, or 3.dll) for performing the security functions may be packaged with the files 1 by the installation file manufacturing instrument 2. Accordingly, the installation file 3, which is a result of the packaging, may include the files 1, the security modules (for example, 1.dll, 2.dll, or 3.dll), and the setting file (for example, info.ini), as illustrated in FIG. 2.

In the software security method according to the embodiment of FIG. 2, a predetermined agent (for example, a controller) for performing the software security method may be further included in the installation file 3 by an image production instrument 4. The image production instrument 4 may further include, in the installation file 3, policy files having information about the usage authority of the software and/or a virtual device driver (VDD) for mounting the security area which is to be described later.

The image production instrument 4 may produce an installation file 5 by including at least one of a controller, a policy file, and a VDD in the installation file 3. As described later, the installation file 5 may further include a splitter (not shown) and/or and various headers for installing files corresponding to each of a user area and a security area according to the software security method of FIG. 2. The installation file 5 may be a virtual drive image file.

Korean Patent No. 0692964, assigned to the applicant of the present invention and entitled "Method of driving virtual disk and recording medium having the method recorded thereon", discloses a virtual disk driving method in which, when a file into which a virtual disk image and a VDD are packaged is executed, the VDD is automatically installed in a user terminal, and the virtual disk image is mounted. The contents of the invention disclosed in Korean Patent No. 0692964 are included as a reference in the specification of the present invention.

As a result, the installation file 5 may be produced with a virtual drive (or disk) image file, and the image production instrument 4 may be used to produce the installation file 5 with such a virtual drive image file.

The installation file 5 may include the installation file 3, the controller for performing the software security method of FIG. 2, at least one policy file for prescribing the usage authority of the software, and/or a VDD as disclosed in Korean Patent No. 0692964. As a result, the software distributor may distribute the installation file 5 to users via a predetermined storage device (for example, a disk, a CD, etc.) or provide the installation file 5 to users in a format which can be downloaded through the Internet.

A user may store the installation file 5 in a user terminal. Alternatively, if the user downloads the installation file 5 through the Internet, the user may temporarily store the installation file 5 and execute the same. According to the core technical spirit of the software security method of FIG. 2, when the installation file 5 is executed, virtual files are basically installed in a user area of the user terminal described above with reference to FIG. 1 (or a user area to be described later with reference to FIG. 3), and actual files are installed in a security area of the user terminal.

Here, the term "security area" denotes any area that can be controlled to prevent unauthorized usage and/or duplication of users according to a method of controlling, through API (Application Program Interface) hooking, functions called by a user process that approaches a virtual drive and to allow only authorized processes to approach the virtual drive, like a virtual drive disclosed in Korean Patent Application No. 10-2007-0060408 (hereinafter, referred to as a previous application), assigned to the applicant of the present invention and entitled "Contents security method and contents security apparatus" In other words, the term "security area" may denote all data-storable areas that can check the functions called by a user process to approach not only a virtual drive as disclosed in the previous application but also a local disk of a user and can provide a security function through a hooking operation.

Figure 3:
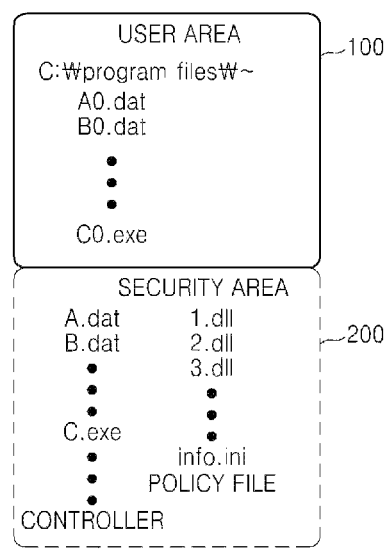
FIG. 3 illustrates a state of a user terminal after software is installed therein according to the method of providing security for software illustrated in FIG. 2.

The contents of the invention disclosed in the previous application are included as a reference in the specification of the present invention. For convenience of explanation, the security area will now be described by taking a virtual drive as an example, but the present invention is not limited to this example. As a result, when a user executes the installation file 5 of FIG. 2, files are installed as illustrated in FIG. 3. When the user executes the installation file 5, the user may undergo an authentication procedure through a serial number as in a conventional software installing method, and also undergo a procedure of registering a web page that the software distributor operates (or a web page which is operated for the software distributor) through the Internet.

When the user finishes the registration procedure properly, a procedure of authenticating a usage authority or the like through a digital rights management (DRM) solution may be performed between a server of the web page and a terminal in which the software is installed. This authentication procedure will now be described in greater detail.

FIG. 3 illustrates a state of a user terminal after software is installed in the user terminal according to the software security method of FIG. 2. Referring to FIG. 3, when a user executes (for example, double-clicks the mouse or presses the enter key) the installation file 5, the splitter included in the installation file 5 may install virtual files corresponding to the files 1 in a user area 100 of the user terminal and install the files 1 and the controller in a security area 200 of the user terminal.

The virtual files installed in the user area 100 may be at least one virtual execution file (for example, C0.exe) and at least one virtual data file (for example, A0.dat, B0.dat, etc.) required to drive the virtual execution file. The virtual data files may be files of 0-byte size with no contents or files including specific information irrelative to execution of the software according to the type of embodiment.

As a result, since the files installed in a user area that can be arbitrarily accessed by users are virtual files, even when the users copy the files without authority, software is not executed. The virtual execution file may indirectly drive the software when a user executes the virtual execution file. This will be described later in greater detail. The files (for example, A0.dat, B0.dat, C.exe, etc.) may be installed in the security area 200 by using the installation file 3 included in the installation file 5. The controller and/or the aforementioned security modules and the aforementioned setting file may be further installed in the security area 200. For convenience of explanation, in FIG. 3, the names of the files installed in the user area 100 are different from those of the files installed in the security area 200. However, the names of the files installed in the user area 100 and the security area 200 may be the same. The names of the files installed in the user area 100 and the security area 200 may be the same as even those of the files 1 from which the installation file 3 is produced in FIG. 2. Consequently, an effect where files are installed in the user area 100 so as to have the same state as that of the files installed according to the conventional software installing method is generated from a user's point of view.

When the security area 200 is a virtual disk drive and the installation file 5 automatically mounts the virtual disk drive as disclosed in Korean Patent No. 0692964 assigned to the applicant of the present invention, the above-described effect increases. Although it is illustrated for convenience of explanation that an equal number of virtual files to the number of files 1 are installed in the user area 100, the present invention is not limited thereto.

Figure 4:
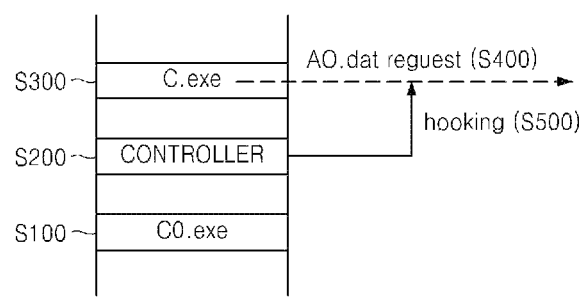
FIG. 4 illustrates a schematic memory state and a data flow for illustrating the method of providing security for software illustrated in FIG. 2.

FIG. 4 illustrates a schematic memory state and a data flow for illustrating the software security method of FIG. 2. Referring to FIGS. 3 and 4, in the software security method of FIG. 2, a user may execute the virtual execution file (for example, C0.exe) stored in the user area 100 in order to execute the software.

When the user executes the virtual execution file (for example, C0.exe), an actual execution file (for example, C.exe) which drives the software is finally executed, but the virtual execution file performs a function of certifying a usage authority during execution of the software. In operation S100, when the virtual execution file is executed, the virtual execution file may perform a usage authority certifying function based on the policy files stored in the security area 200.

The usage authority certifying function may include at least one of a certification of a user, a certification of a use frequency, and a certification of a usage duration. These certifications are just examples, and the present invention is not limited thereto. The policy files may be produced by a software distributor (or a software seller) and may be defined in a DRM system according to a generally-used rule (for example, an extensible rights Markup language (XrML)) or a specially prescribed rule.

In operation S100, when the virtual execution file is executed, a user terminal may be connected to the server of a web page of the software distributer or to a special authentication server through the Internet, and thus, for example, user authentication based on the policy files may be performed using a DRM solution.

As a result, the virtual execution file appears as the actual execution file to users, but the virtual execution file performs an authentication function during software execution. Accordingly, the software distributor can still control usage authority even after the software is installed. Thus, the software distributor distributes the installation file 5 and also allows users to copy the software, and thus various selling models and various paid policies about the software may be applied.

After the authentication function is performed in operation S100, the virtual execution file may activate the controller stored in the security area 200, in operation S200. The virtual execution file may transmit, to the controller, the name of the actual execution file or information about a path of the actual execution file in the security area 200 so that the controller can execute the actual execution file. The reason why the virtual execution file is transmitted to the controller is that the virtual execution file is a virtual file of the execution file (for example, C.exe) and thus may include information about the execution file.

In operation S300, the controller which has received the information about the actual execution file may execute the actual execution file. Even while the actual execution file is being executed, the controller is continuously activated and controls the actual execution file. For example, if the actual execution file calls a predetermined function in order to refer to a data file (for example, A.dat) in operation S400, since a virtual data file (for example, A0.dat) exists in a directory of the data file (for example, A.dat) to which the actual execution file tries to refer, the controller may hook the function called from the actual execution file to the OS (or a file system) of the user terminal, through API hooking, in operation S500.

The controller may change a path of the hooked function to the path of the actual data file and output changed path. Accordingly, the actual execution file may properly refer to the actual data file (for example, A.dat). As a result, the actual execution file may be able to properly refer to all data files.

As described above, while the actual execution file is being executed, if an event (or an operation) corresponding to information about setting of security functions set during production of an installation file is generated, that is, if process corresponding to the actual execution file desires to approach a security module corresponding to the information about the setting, the controller may activate a security module corresponding to the information about the setting so as to perform a corresponding security function.

For example, when a software distributor refers to a file A.dat, if a screen capture preventing function has been set, information about this setting may be stored in a setting file (for example, info.ini). Accordingly, since the controller is able to know a case where the execution file refers to the file A.dat through API hooking, the controller may activate a security module (for example, 1.dll) corresponding to the screen capture preventing function on the basis of the information stored in the setting file.

The functions of the security modules (for example, a clip board function, a screen capture preventing function, a screen saving function, etc.) may also be performed through API hooking based on injection. For example, each of the security modules may perform its function by hooking a function (or a message) called by a process or OS desiring to approach the security area 200, allowing only functions authorized by each of the security modules to approach the security area 200, and outputting a null return for unauthorized functions. The functions of the security modules are disclosed in detail in the previous application which is assigned to the applicant of the present invention and entitled "Contents security method and contents security apparatus", so a detailed description thereof will be omitted.

The software security providing method according to the embodiment of the present can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers of ordinary skill in the art to which the present invention pertains.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

The present invention is applicable when an installation file of software is provided and when the software is executed in a user computer.

The invention claimed is:

1. A software security method comprising:
executing an installation file of software that includes at least one execution file and at least one data file which are stored in a user terminal;
accordingly installing at least one virtual execution file corresponding to the at least one execution file and at least one virtual data file corresponding to the at least one data file in a user area of the user terminal and installing, in a security area of the user terminal, the at least one execution file, the at least one data file, and a controller for controlling the at least one virtual execution file and the at least one execution file;
executing a first virtual execution file from among the at least one virtual execution file installed in the user area; and
accordingly executing a first execution file corresponding to the first virtual execution file, wherein the first execution file is installed in the security area.

2. The software security method of claim 1, further comprising executing at least one of user authentication, usage frequency authentication, and usage duration authentication when the first virtual execution file is executed.

3. The software security method of claim 2, further comprising activating the controller when the first virtual execution file is executed.

4. The software security method of claim 3, wherein when the controller outputs a message indicating that the first execution file refers to the first virtual data file from among the at least one virtual execution file installed in the user area, the controller hooks the message and controls a path for the first data file corresponding to the first virtual data file to return to the first execution file.

5. The software security method of claim 1, wherein the security area is a virtual drive.

6. The software security method of claim 5, wherein the installation file comprises the virtual drive and a virtual device driver for automatically mounting the virtual drive when the installation file is executed.

7. The software security method of claim 1, wherein:
the security area further comprises a setting file including information about setting of at least one security function set during production of the installation file, and at least one security module corresponding to the at least one security function; and
the controller controls the at least one security module to perform the at least one security function on the basis of information stored in the setting file.

8. The software security method of claim 7, wherein the at least one security function comprises at least one of a screen saving function, a screen capturing preventing function, and a clip board controlling function.

9. A software security apparatus comprising:
a memory storing a program; and
a central processing unit (CPU) performing the program, wherein the program is performed under the control of the CPU so that when an installation file of software that includes at least one execution file and at least one data file which are stored in a user terminal is executed, at least one virtual execution file corresponding to the at least one execution file and at least one virtual data file corresponding to the at least one data file are installed in a user area of the user terminal, and the at least one execution file, the at least one data file, and a controller for controlling the at least one virtual execution file and the at least one execution file are installed in a security area of the user terminal,
wherein the program is performed so that when a first virtual execution file from among the at least one virtual execution file installed in the user area is executed, a first execution file corresponding to the first virtual execution file, the first execution file being installed in the security area, is executed.

10. The software security apparatus of claim 9, wherein the program controls the controller to be activated when the first virtual execution file is executed.

11. The software security apparatus of claim 10, wherein when the controller outputs a message indicating that the first execution file refers to the first virtual data file from among the at least one virtual execution file installed in the user area, the controller hooks the message and controls a path for the first data file corresponding to the first virtual data file to return to the first execution file.

* * * * *